Nov. 1, 1960    J. D. CONTI    2,958,366
HEAT SEALING APPARATUS
Filed March 5, 1956    3 Sheets-Sheet 1

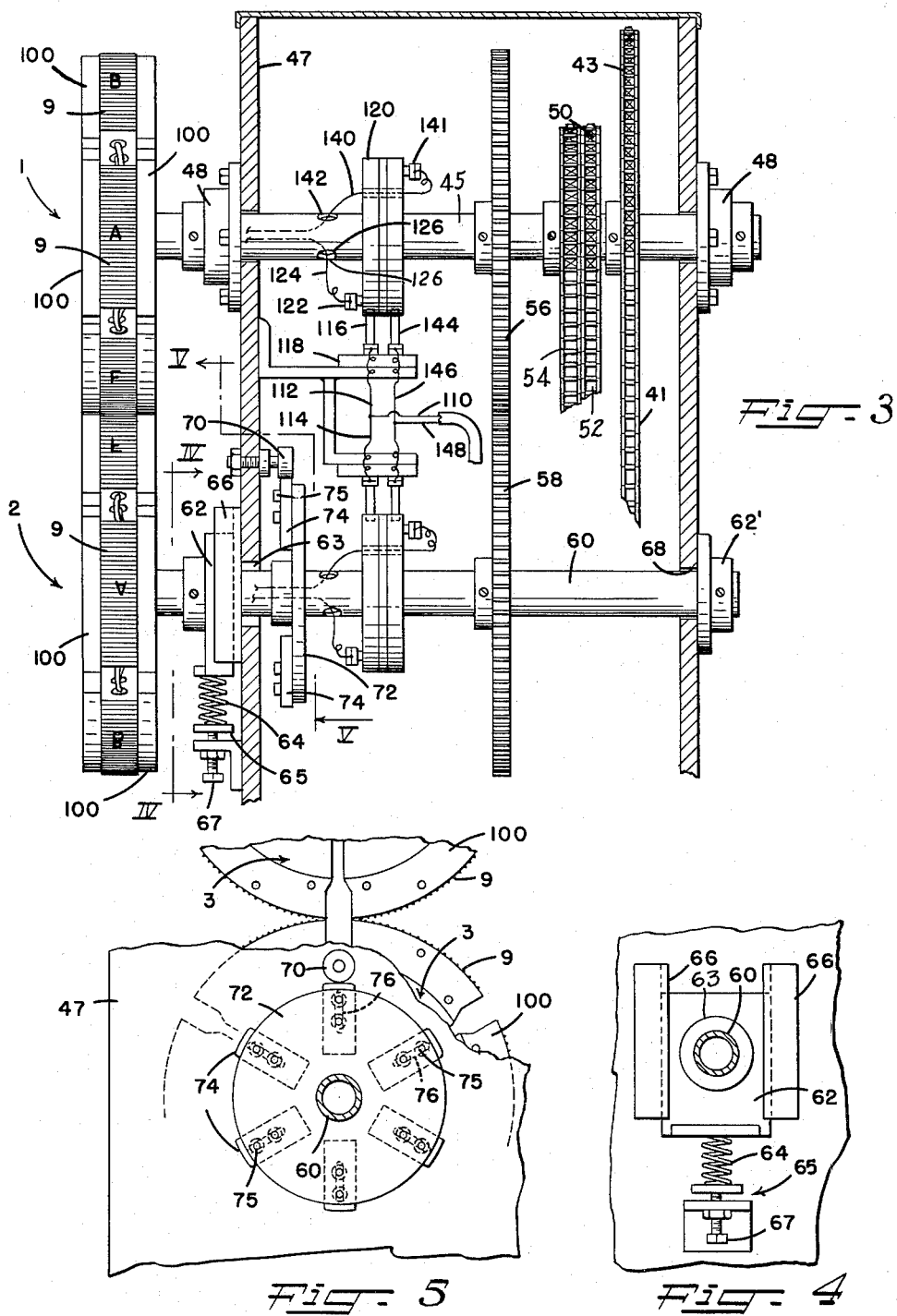

Nov. 1, 1960 J. D. CONTI 2,958,366
HEAT SEALING APPARATUS
Filed March 5, 1956 3 Sheets-Sheet 3

United States Patent Office 2,958,366
Patented Nov. 1, 1960

2,958,366

HEAT SEALING APPARATUS

John D. Conti, Elkins Park, Pa., assignor to American Viscose Corporation, Philadelphia, Pa., a corporation of Delaware Filed Mar. 5, 1956, Ser. No. 569,491

6 Claims. (Cl. 154—42)

My present invention relates to a heat sealing apparatus for sealing together sheets of plastic and other material which are capable of being joined together through the application of heat and pressure. In particular, my invention relates to a heat sealing apparatus which may be used to test or determine the optimum conditions for forming a seal between a specific type of heat-sealable material.

To effect the best all around seal between sheets or strips of heat-sealable material, many factors must be taken into consideration. Among these factors is that of the sheet thickness. A longer period of sealing time is required to effectively seal together thicker sheets or strips of heat-sealable material than is required to seal thinner sheets of material. The temperature of the heat sealing units and the contact time of these heating units with the sheets will also vary according to the number of layers of material to be sealed together.

With some types of heat sealing apparatus, the material to be sealed is heated on one surface only. This is, of course, an important factor to be considered since an unheated surface would tend to retard heat penetration. Sealing from one surface would also require a closer timing to allow heat penetration for an effective bond and at the same time prevent scorching the surface to which the heat is applied.

The specific type of coating used on a film, such as a moisture proof coating as used on regenerated cellulose films, must also be considered when determining the optimum sealing temperature, time of contact with the heating element, etc.

With all types of heat sealing apparatus, overheating will reduce the effectiveness of the bond between the sheets or strips of material and possibly damage the material. For instance, cellophane, which is partially dependent upon moisture for its strength and durability, is seriously weakened by a loss of moisture by application thereto of excessive and prolonged heating. Heretofore, much time, energy and money has been expended in attempting to determine the optimum conditions under which a specific type of heat sealable material is to be sealed.

It is therefore the primary object of my invention to provide an apparatus for rapidly and efficiently preparing test samples under varying conditions as to temperature and time of heat application whereby the optimum sealing conditions of the material may be more easily determined.

Another object of my invention is to provide a heat sealing apparatus for sealing together strips of heat sealable material wherein a pair of heat sealing rotatable heads are provided which cooperate with one another to form a nip therebetween through which the strips to be heat sealed are fed.

A still further object of my invention is to provide spaced apart peripheral zones of varying temperature around the sealing heads of the above object.

Another object of my invention is to provide a series of spaced apart heating segments of varying temperature around each of a pair of cooperating sealing heads which segments have crimping teeth surfaces whereby crimp seals are formed in the heat sealable material.

Additional objects and advantages will become apparent from a study of the following description and drawings wherein:

Figure 3 is an end view, partially sectioned, of my heat sealing apparatus;

Figure 4 is a detail taken along lines IV—IV of Figure 3;

Figure 5 is a detail taken along lines V—V of Figure 3;

The invention relates to a heat seal testing unit for testing heat sealing characteristics of heat sealable material such as coted cellophane. A pair of cooperating rotatable sealing heads are provided each of which has a plurality of separate sealing units or segments. Means are provided for heating and controlling the temperature of each segment separately whereby each pair of opposing segments of the two sealing heads have the same sealing temperatures but may be of different temperature than the remaining pairs of opposing segments. Means are provided for adjusting and varying the r.p.m. of the sealing heads.

Figure 1:
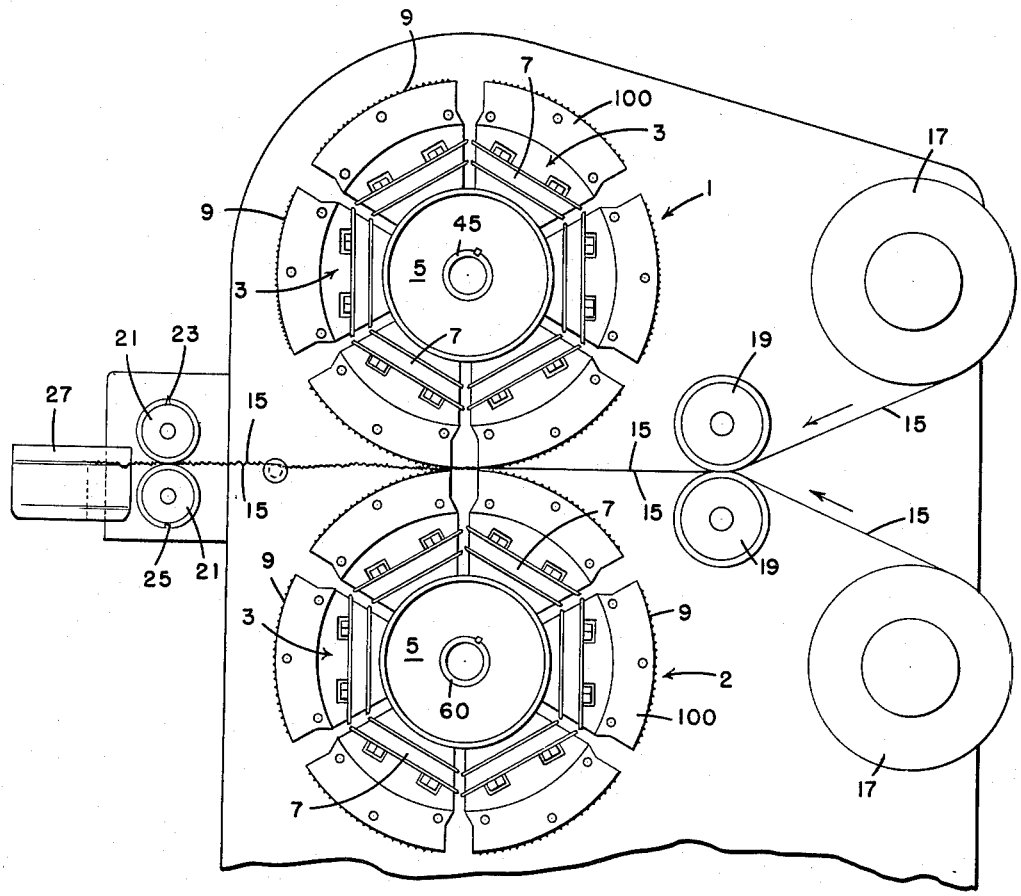
Figure 1 is a side view of my heat sealing apparatus.

Referring now to Figure 1 of the drawings, there is provided a pair of rotatable sealing heads 1 and 2. The sealing heads 1 and 2 cooperate as shown in the drawings to form a nip between their peripheral surfaces as the heads rotate. Each head 1 and 2 comprises a plurality of spaced apart heating segments 3, 3 which segments are secured to the hubs 5, 5 of the heads 1 and 2. To prevent the transmission of heat from one heating segment 3 through the hub 5 to an adjoining segment 3, layers of insulation 7, 7 are provided between the periphery of each segment 3 and the hub 5 of the heads 1 and 2. In addition, each heating segment 3, 3 has a peripheral surface pattern of crimping teeth 9, 9 formed thereon.

The continuous strips or sheets of heat-sealable material 15, 15 to be tested for determining the optimum heat sealing conditions are stored on supply rolls 17, 17. These strips are drawn from the supply rolls by driven nip rollers 19, 19 which cause the strips 15, 15 to become superimposed as they are drawn from the supply rolls 17, 17. From this point, the superimposed strips are fed into the nip of the sealing heads 1 and 2. As the strips contact the heating segments 3, 3, the superimposed strips are pressed together while the heat from the segments 3, 3 bonds the strips together. The sealed and crimped strips 15, 15 are then drawn from between the nip of the sealing heads 1 and 2 by drawoff rollers 21, 21. As seen in Figure 1, a cutting blade 23 is secured to one of the rollers 21 which blade 23 cooperates with a notch 25 in the opposite roller to sever the sealed strip as it passes between the rollers 21, 21. The rollers 21, 21 are so timed with respect to the sealing heads 1 and 2 that the strips are severed through their unsealed portions resulting from the fact that there is no heat or pressure applied to the strips from the open sections of the sealing heads lying between the heating segments 3, 3. The cut samples are collected in a collection unit 27. As will be explained hereinafter, each heating segment may be maintained at a different sealing temperature. The opposing and cooperating segments 3, 3 of each sealing head 1 and 2 are of course maintained at the same temperature.

Figure 2:
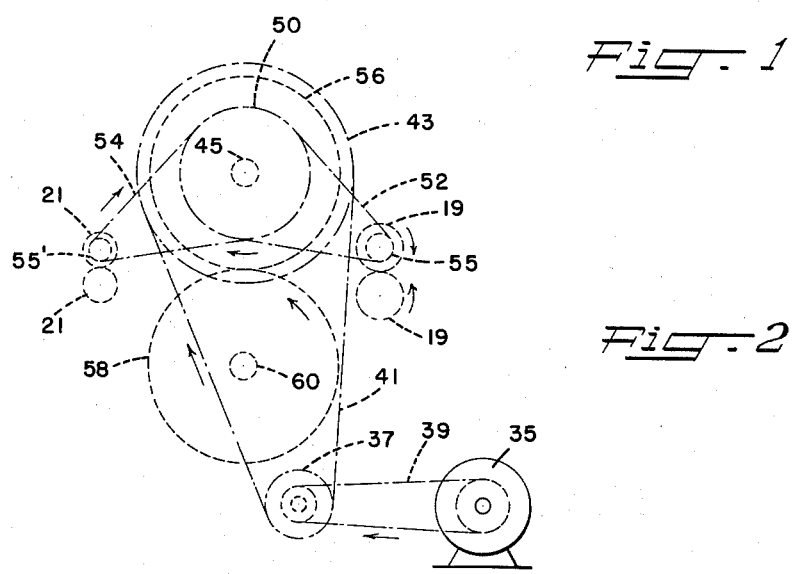
Figure 2 is a diagrammatic view of the driving means for my heat sealing apparatus.

The driving system for the sealing heads 1 and 2 and the feed and draw-off nip rollers 19, 19 and 21, 21 respectively is shown in detail in Figures 2 and 3 of the drawings. As seen in Figure 2, a motor 35 drives an intermediate sprocket 37 through chain 39. A drive chain 41, leading from the intermediate sprocket 37, drives the sprocket 43 and thus the hollow shaft 45 supporting the sprocket 43 and the upper sealing head 1. The shaft 45 is journalled in a supporting frame 47 by bearings 48, 48. To rotate the feed nip rolls 19, 19 and the draw-off rolls 23, 23, a double track sprocket 50 is secured to the shaft 45 and supports and rotates drive chains 52 and 54 which, as seen in Figure 2, are laced around sprockets 55, 55' affixed to one of the feed rolls 19 and one of the draw-off rolls 21 respectively. To rotate the sealing head 2, a spur gear 56 is secured to the hollow shaft 45 which cooperates with a spur gear 58 secured to a hollow shaft 60 which supports the sealing head 2 and is supported for rotation in the frame 47 by the front vertically pivotal bearing 62 and the back bearing 62'. With the above arrangement, the r.p.m. of the sealing heads 1 and 2, the feed nip rolls 19, 19 and the draw-off rolls 21, 21 may be adjusted through the motor 35 as desired to increase or decrease the dwell time of the strips 15, 15 between the sealing heads 1 and 2.

As seen in Figures 3 and 4, a slight clearance is provided between the shaft 60 for the sealing head 2 and its front shaft support 63 of frame 47. With this arrangement, a slight vertical pivoting of the shaft 60 is permitted within the frame 47. To constantly urge the shaft 60 toward the opposing shaft 45, and thus urge the sealing head 2 against the head 1, the shaft 60 is spring-loaded through tension spring 64 (see Figure 4) supported between a platform assembly 65 secured to the frame 47 and the front bearing 62 for the shaft 60. The bearing 62 is vertically slidable within tracks 66, 66 (Figure 4) secured to the frame 47 whereby the bearing 62, the shaft 60 supported thereby, and the sealing head 2 may be vertically pivoted within its front frame support 63. The pivotal movement of the shaft permitted is so slight, thousandths of an inch, that there is no perceptible pivoting action at the rear shaft support 68. To adjust the tension on the spring 64, an adjusting screw 67 is provided adjacent the platform end of the spring 64. With this arrangement, the pressure exerted by the sealing head 2, supported by the spring-loaded shaft 60 upon the head 1, may be adjusted and varied slightly as desired.

As clearly seen in Figures 1, 3 and 5, the heating segments 3, 3 are supported in spaced apart relationship around the hubs 5, 5 of the sealing heads 1 and 2. With this arrangement, voids or open sections are formed between adjacent segments 3, 3. To prevent the sealing head 2 from bumping or running flat with the head 1 when corresponding and opposing openings of the two heads meet during rotation, a cam system is provided whereby the sealing head 2 supported by the pivotable shaft 60 is held apart from the head 1 every time opposing voids of the two heads meet during rotation. With this cam arrangement, the head 2 will continuously describe a true circular path as it rotates in engagement with the head 1.

As seen in Figures 3 and 5, a cam follower 70 is rotatably secured to the supporting frame 47. A flange 72 is secured to the hollow shaft 60 which supports the sealing head 2. Affixed and spaced around one face of the flange 72 are cams 74, 74 which protrude slightly beyond the flange periphery. Every time a cam 74 contacts the follower 70, the shaft 60, which supports the flange, is held in position within the shaft support 63 thus preventing the head 2 from moving upwardly toward the head 1 when opposing open sections of the two heads meet. This camming arrangement is correlated with the rotation of the sealing heads 1 and 2 so that a cam 74 contacts the follower 70 every time opposing open sections of the heads 1 and 2 meet during rotation. As seen in Figure 5, each cam 74 is secured to the flange 72 by securing means 75 which fit through elongated slots 76 in the cams 74, 74. With this arrangement, the position of the outer ends of the cams 74, 74 with respect to the periphery of the flange 72 may be adjusted by sliding the cams 74, 74 either backwards or forward along the securing means and then tightening the securing means.

Figure 6:
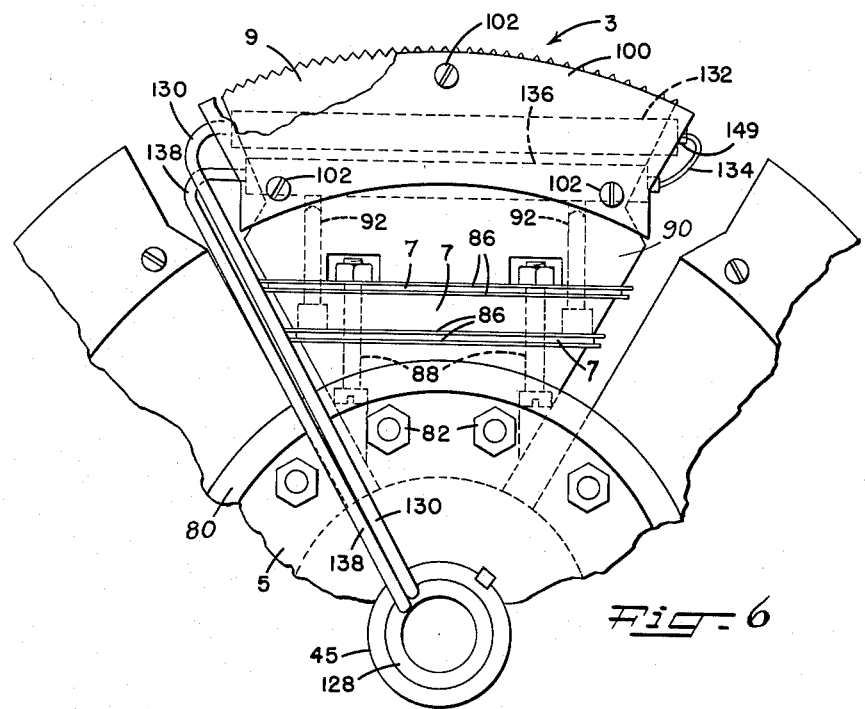
Figure 6 is a fragmentary elevation of a portion of one of the sealing heads.
Figure 7:
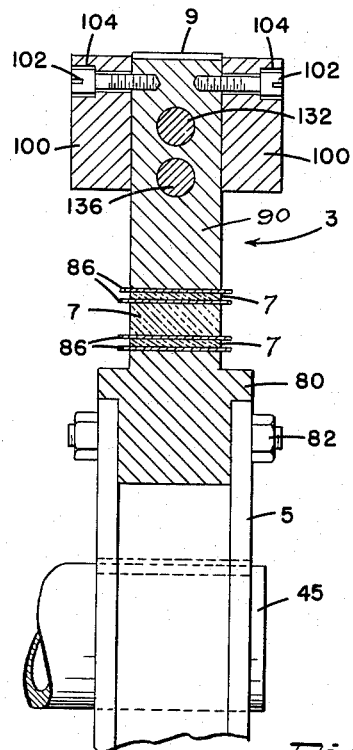
Figure 7 is a section taken through one of the heating segments affixed to the sealing head.

The structure and make-up of each heating segment 3 is shown in Figures 6 and 7 of the drawings. As seen therein, each segment is formed of a wedge-shaped base piece 80 secured to the hub 5 by bolts 82, 82. Secured to the base piece 80 are several layers of insulation material 7, 7 such as transite or other suitable insulation material. The insulation layers are housed between metal cooling plates 86, 86. Bolts 88, 88 extend through the layers of insulation, the metal cooling plates 86, 86 and the wedge-shaped base piece 80 as shown in Figure 6 to hold them in fixed position. An outer substantially wedge-shaped element 90 is affixed to the outer metal strips 86 by bolts 92, 92 extending through the insulation layers and outwardly through the outermost metal strips 86, 86 as shown in Figure 6. The curved periphery of the outer wedge-shaped member 90 is finished in a surface of crimping teeth 9.

As seen in Figures 1, 3, 5, 6 and 7, a pair of cam plates 100, 100 are secured to opposite faces of the outer wedge-shaped member 90 of each heating segment 3 of both sealing heads 1 and 2. As seen more clearly in Figures 6 and 7, the plates 100, 100 are secured to the outer member 90 by screws 102, 102. The holes in the cam plates 100, 100 through which the screws 102, 102 extend are slightly larger in diameter than the shafts of screws 102, 102. With this arrangement, the cam plates 100, 100 may be moved vertically on the members 90 to expose or cover up a portion of the crimped toothed surface 9 formed on the periphery of each wedge-shaped member 90. The heads of the screws 102, 102 are tightened against shoulders 104, 104 (Figure 7) formed within the cam plates 100, 100. With such arrangement, the depth to which the crimped toothed surface of a heating segment 3 of the head 1 cooperates with the crimped toothed surface of an opposing segment 3 of the sealing head 2 may be regulated. This is an important feature of applicant's invention in that the packager may regulate the degree of crimp introduced into the heat seal of a bag, envelope, etc.

As mentioned above, each segment 3 of the sealing heads 1 and 2 are heated to and maintained at definite and different temperatures. For instance, the 6 heating segments 3 of each head may be heated to the following progressive temperatures: 250° F., 265° F., 270° F., 280° F., 290° F., 310° F. The segments of the opposite sealing head which oppose and cooperate with the above heated segments will have corresponding temperatures. The electrical system for heating each segment of the two heads 1 and 2 is shown in Figures 3, 6 and 7. As seen in Figure 3, the electrical current is introduced through wire 110 which is divided into wires 112 and 114 whereby the current passing through the wire 110 passes through the wires 112 and 114 to each sealing head. To trace the circuit for the sealing head 1, the current passes through wire 112 into a brush 116 which is in surface contact with a commutator 120 secured to shaft 45 and which is supported on a base 118 suitably affixed to the main frame 47. From the commutator 120, the current passes into conductor 122 and into the shaft wire 124. The shaft wire 124 is threaded through a hole 126 in the hollow shaft 45 and passes therethrough to a distributing ring 128 (see Figure 6). From the distributing ring 128, the current travels through a separate wire 130 connected to a thermostate 132 imbedded in the outer portion of the outer wedge-shaped member 90. The thermostat is connected at its opposite end by connecting wire 134 to the heating element 136 whereby the current is introduced into the heating element. A return wire 138 in turn is connected with the opposite end of the heating element and to the distributing ring to pass the current back through the shaft distributing ring 128.

A return shaft wire 140 connected with the distributor ring 128 and conductor 141 of commutator 120 passes through hole 142 of hollow shaft 45 whereby the electrical current passes from the distributing ring, through the commutator 120 and into brush 144. The current then passes through auxiliary return line 146 connected with the brush 144 and through the main return line 148. Since each head has 6 heating segments with a thermostat 132 and heater 136 in each segment, there are six lead and return wires 130 and 138 connected with the distributing ring 128. From the above description, it is seen that the heating segments 3, 3 are connected in parallel with the supply current whereby the temperature of each heating segment 3 may be adjusted and maintained. Each thermostate 132 may be regulated as desired through adjuster 149 to set up definite temperatures within each segment 3, 3. The circuit current is of course duplicated for the sealing head 2.

As mentioned above, the sealed strips 15, 15 are cut or severed along their unsealed zones as they pass through the draw-off nip rolls 21, 21. To identify or determine the temperature at which specific cut samples were sealed, identification letters or numerals are cut into the crimped teeth surface of each heating segment 3 as seen in Figure 3. The operator then knows that the heating segment 3 as identified with an "A" was heated to a temperature of 250° F. To select the cut sample which was sealed at 250° for testing purposes, the operator merely looks for the sample having an "A" imprinted on its crimped seal.

The r.p.m. and temperature of my crimped sealer can be varied and adjusted to permit increasing or decreasing temperatures and dwell time. An important advantage of my invention is that the sealer can accommodate various types of plastic or other heat sealable material. In addition, the sealer has flexibility and may be moved around to different stations, which feature is highly desirable in laboratory equipment.

The sealing operation is continuous and gives a sealing action which is similar to that obtained in bag closure operation for which this type (single rotary crimp) apparatus is generally used. By having the six separate units maintained at different sealing temperatures, my sealer enables one to evaluate the crimp sealing quality of heat sealable material from the standpoint of seal strength, coating accumulation, tendency of the coating to stick or cling to the heat sealing units in addition to such other valuable information whereby the best sealing temperature for any definite film may be easily determined. It has also been found that the use of my sealer saves the operators and producers much time and material.

While preferred embodiments of the invention have been shown and described, it is to be understood that changes and variations may be made without departing from the spirit and scope of the invention as defined in the appended claims.

I claim:

1. A heat sealing unit for preparing seal evaluation samples from strips of heat-sealable material comprising a pair of rotatable sealing heads of substantially round shape which heads are so supported that their peripheries cooperate to form a nip, a hollow drive shaft for each head, a frame having supports for the shafts, supporting journals for the shafts, the clearance between one of the supports for one shaft and the shaft supported thereby being sufficient to permit a slight pivotal movement of the shaft therein, spring tension means for urging the pivotable shaft toward the other shaft thereby also urging together the sealing heads supported by the shafts, each head comprising a hub, a plurality of separated wedge shaped heating segments secured to the hub with the narrow portion of the wedge shaped member lying adjacent the hub, the outer edge of each segment terminating in an arc whereby a circle is described by the total number of segments secured to the hub, a crimping teeth surface on the outer edge of each heating segment, means for rotating the heads, means for feeding a pair of heat-sealable strips in superimposed relationship between the heads, means for withdrawing the sealed strips from between the heads, and means for driving the shafts supporting the hubs.

2. A heat sealing unit according to claim 1 comprising a cam supporting disc secured to the spring tensioned rotatable shaft which supports one of the sealing heads, a plurality of spaced apart cams spaced around the disc and secured thereto, a cam follower secured to the frame support for the shafts, said cam follower and cams serving to prevent the spring tensioned shaft and its sealing head from moving toward the other shaft and its sealing head when the voids between the heating segments of the heads are opposite one another during rotation of the heads whereby the heads will continue to rotate in a smooth circular path.

3. A heat sealing unit according to claim 2 comprising adjustable cam plates secured to the front and back faces of each heating segment to regulate the depth to which the teeth of opposing and cooperating heating segments of the heads are permitted to intermesh.

4. A heat sealing unit according to claim 1 comprising an electrical lead wire extending through the hollow shaft supporting a sealing head for conducting an electrical current through the shaft, said lead wire being rotatable with the shaft, a distributing ring affixed to the inner wall of the shaft and connected with the lead wire, a plurality of auxiliary lead wires connected to the distributing ring, a thermostat imbedded in each heating segment and connected with one of the auxiliary lead wires affixed to the distributing ring, a heating element imbedded in each heating segment and connected with the thermostat, an auxiliary return wire connected with each heating element, said auxiliary return wires being connected with the distributing ring, and a single return wire connected with the distributing ring and extending through the hollow shaft, said return wire being rotatable with the shaft.

5. A heat sealing unit for preparing seal evaluation samples from strips of heat-sealable material comprising a rotatably mounted sealing head, said head comprising a hub, a plurality of heating elements secured to said hub, each of said elements being in substantially the form of a sector of a circle and the arcs of the sectors being spaced from one another, means separating each of said elements into an outer heat sealing portion and an inner hub-connected portion, said means including an electrically non-conductive section and heat dissipating means whereby the temperature of one outer portion will not affect the temperature of any other outer portion, means for supplying an electric current to the outer portion of each of said elements to heat the same, and a thermostat in each of said outer portions for independently controlling the temperature thereof whereby each of said outer portions may be maintained at a different temperature.

6. A heat sealing unit for preparing seal evaluation samples from strips of heat-sealable material comprising a wheel having a central hub and a plurality of elements connected to the hub and radiating outwardly therefrom, said elements being spaced from one another and having arcuate outer faces which together form a discontinuous circular periphery for the wheel, said elements each comprising an outer peripheral portion and an inner hub connected portion separated by heat dissipating means which prevents heat applied to the outer portions from migrating to the inner portions, means for maintaining the arcuate faces of said elements at elevated temperatures with the temperature of each face differing from the others, means for rotating said wheel, means for feeding a pair of superposed strips of heat sealable material into contact with the periphery of said wheel whereby said strips will be heated to different extents by the different ones of the arcuate faces of said elements, and indicia on said arcuate portions for marking the strips so as to indicate the portions of the strips contacted by the different one of said faces.

References Cited in the file of this patent

UNITED STATES PATENTS

| | | |
|---|---|---|
| 2,653,646 | Swartz | Sept. 29, 1953 |
| 2,675,054 | Langer | Apr. 13, 1954 |
| 2,680,471 | Mercer | June 8, 1954 |
| 2,697,473 | Techtmann | Dec. 21, 1954 |
| 2,719,567 | Gardner | Oct. 4, 1955 |
| 2,738,827 | Roll | Mar. 20, 1956 |
| 2,766,809 | Parham | Oct. 16, 1956 |
| 2,780,275 | Rusch et al. | Feb. 5, 1957 |
| 2,796,913 | Fener et al. | June 25, 1957 |

FOREIGN PATENTS

| | | |
|---|---|---|
| 1,104,262 | France | Nov. 17, 1955 |